Oct. 10, 1933.  B. CATALINE  1,929,808
SELF LOCKING NUT
Filed Aug. 26, 1929

Inventor
Benton Cataline
By Blackmore, Spencer & Flint
Attorneys

UNITED STATES PATENT OFFICE 1,929,808

SELF-LOCKING NUT

Benton Cataline, Flint, Mich., assignor to General Motors Corporation, Detroit, Mich., a corporation of Delaware Application August 26, 1929. Serial No. 388,375

7 Claims. (Cl. 151—38)

To secure demountable wheels to the wheel hubs of automotive vehicles, bolts, which extend through a flange on the hub and through portions of the wheel adjacent the inner periphery thereof, and nuts, which are threaded on the bolts, are commonly employed. It has been found that nuts of any of the common types cannot be employed with entire satisfaction for the purpose above mentioned because the shocks and vibrations which are imparted to the wheels, during the use of the vehicle, commonly cause them to become loose on or drop off the bolts.

My invention relates to a nut which is particularly adapted for use in securing a demountable wheel to the wheel hub of an automotive vehicle and which will not become loose on or drop off the bolt during the use of the vehicle. The invention resides, in the embodiment which is illustrated in the acompanying drawing, in the provision of a unitary nut and washer assembly which is so constructed and arranged that it cannot become accidentally displaced from the bolt when the parts are properly assembled with the wheel and hub.

For a better understanding of the nature and objects of the invention, reference is made to the following specification in which is described the preferred embodiment of my invention, which is illustrated in the accompanying drawing.

Figures 1, 2:
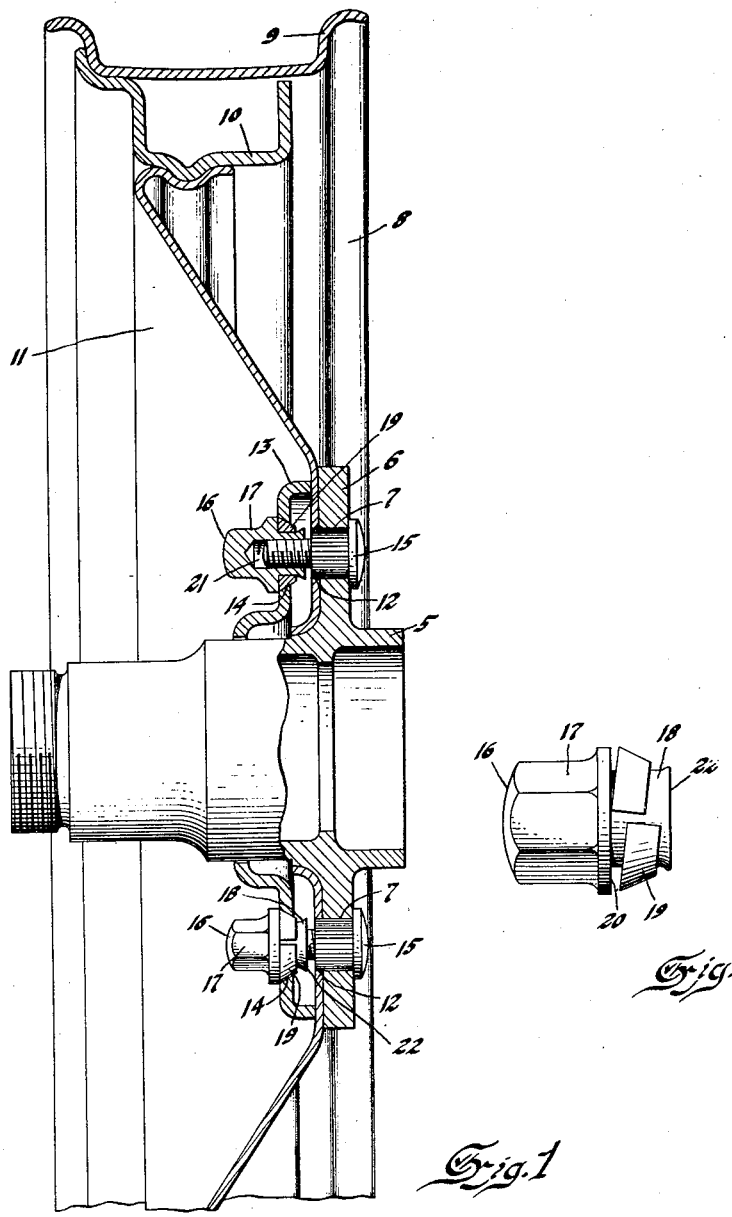
Fig. 1 is a view, mainly in cross-section, showing a demountable wheel and wheel hub assembly in which a nut, in which is embodied my invention, is used in securing the wheel to the hub.
Fig. 2 is an enlarged side elevation of the nut shown in Fig. 1.

In the drawing, the reference character 5 indicates the wheel hub of an automotive vehicle. On the wheel hub, there is provided an annular flange 6 through which extend a plurality of openings 7. The reference character 8 indicates a demountable wheel which consists of a rim 9, a felly 10 which is suitably secured to the rim, and an annular disc 11 which is suitably secured to the felly. Adjacent the inner periphery of the disc 11, there are provided a plurality of openings 12, which are equal in number to the number of openings 7 in the flange 6 of the wheel hub, and which are so arranged that each is adapted to register with one of the openings 7 when the wheel and hub are assembled, as shown in Fig. 1 of the drawing. The reference character 13 indicates a clamping ring through which extend a plurality of bevelled openings 14, which are equal in number to the number of openings 12 in the disc 11, and which are so arranged that each is adapted to register with one of the openings 12 when the parts are assembled, as shown in Fig. 1.

To secure the hub, the wheel, and the clamping ring together, there are provided bolts 15 having threaded ends which are adapted to be inserted through the openings 7, 12 and 14, and nuts 16 which are adapted to be screwed on the threaded ends of the bolts. Each of the nuts 16 consists of a cap portion 17, a barrel portion 18 and a spring washer 19. Through the barrel portion 18, which is formed integrally with the cap portion and is made smaller in diameter than the openings 14 and the adjacent part of the cap portion so as to provide at the junction of the cap portion and the barrel portion a shoulder 20, and into the cap portion extends a threaded bore 21. The washer 19, which is externally tapered and which is formed as a turn of a helix whose ends are spaced apart circumferentially and whose expanded internal diameter is somewhat greater than the external diameter of the barrel portion, is sleeved over the barrel portion with its smaller end toward the outer end of the barrel portion on which is formed an annular flange 22 which prevents removal of the washer from the barrel.

To secure the hub, the wheel, and the clamping ring together, when they are assembled, as shown in Fig. 1, the bolts 15 are inserted through the openings 7, 12 and 14, as shown in Fig. 1, and one of the nuts 16 is threaded on each of the bolts. As the nut is screwed onto the bolt, the inclined wall of the washer will come into contact with the inclined wall of the opening 14. Then, as the nut is tightened, the wedging action of the inclined walls of the opening end of the washer will cause the ends of the washer to approach each other and to come into alignment. Finally, when the nut is properly tightened, as shown in Fig. 1, the ends of the washer will be in alignment, but still slightly spaced apart; the outer end wall of the washer will be firmly seated circumferentially on the shoulder 20; the inner side wall of the washer will be in firm circumferential contact with the barrel, and the inclined wall of the washer will be firmly seated circumferentially on the inclined wall of the opening 14. It will now be obvious that, when the nut is properly tightened, the frictional bearing of the washer on the shoulder 20, the barrel portion and the inclined walls of the opening 14, together with the tendency of the washer to expand circumferentially and resume its helical shape will effectually prevent the nut from turning with respect to the wheel and bolt and will, therefore, prevent loosening and loss of the nut. It will also be obvious that if, for any reason, the distance between the outer surface of the clamping ring 13 and the flange 6 becomes lessened after the nut is drawn up, the tendency of the washer to expand will prevent loosening or loss of the nut.

Although I have shown and described the nut, in which is embodied my invention, as used to secure a demountable wheel to a wheel hub, it is to be understood that this has been done merely by way of example and that the nut may be used for any other analagous purpose without departing from the spirit of the invention.

I claim

1. A nut, which includes a cap portion, a barrel portion, a split, helical, tapered washer sleeved over the barrel portion, and a flange on the outer end of the barrel portion to prevent removal of the washer therefrom.

2. The combination with two elements which are adapted to be secured together, of an opening extending through one of the elements, a tapered opening extending through the other of the elements and in alignment with the opening through the first element, a bolt extending through the openings, a nut, which consists of a body portion, a barrel portion, and a tapered lock washer sleeved over the barrel portion, threaded on the bolt with the inclined walls of the washer seated on the inclined walls of the second-mentioned opening.

3. In a coupled nut and washer assembly, a nut having a base and a skirt extending from the base, said nut having a bore extending through said skirt, and a washer having a single split convolution surrounding said skirt, said washer and said skirt having means consisting of complemental faces on the skirt and the washer to hold the washer on the skirt.

4. In an assembly of the class described, a nut having a base and a skirt extending from said base, said nut having a bore extending through said skirt, and a spring lock washer having a single split convolution embracing said skirt, a portion of said skirt remote from said base being externally enlarged to a diameter greater than the normal minimum diameter of the washer necessitating expansion of the washer to remove the same from the skirt.

5. In a structure of the class described, a screw threaded body having a bearing surface and an annular concentric washer coupling portion contiguous to the bearing surface, and a resilient lock washer embracing said coupling portion and having the outer cylindroidal wall thereof unconfined, said washer and said coupling portion having means consisting of complemental faces on the coupling portion and the washer to permanently couple the washer to said threaded body to allow the washer and the threaded body to be handled as a unit.

6. In a structure of the class described, a screw threaded body having a bearing surface and an annular concentric washer coupling portion contiguous to said bearing surface, and a helical axially compressible lock washer embracing said coupling portion and having the outer cylindroidal wall thereof unconfined, said washer and said coupling portion having means consisting of complemental faces on the coupling portion and the washer to permanently secure the washer to said threaded body, the direction of spiral of said helical washer being opposite to the direction of spiral of the screw threads of said body.

7. A nut which includes a body portion, a barrel portion, a washer sleeved over the barrel portion, and means on the outer end of the barrel portion to prevent removal of the washer therefrom.

BENTON CATALINE.